INVENTOR
LEON GRYK
BY Thomas S. Ross
Joseph R. Spalla
ATTORNEYS

United States Patent Office 3,319,244

Patented May 9, 1967

3,319,244

CODE CONVERTER WITH PROVISION FOR AUTOMATICALLY GENERATING PRECEDENCE CODES

Leon Gryk, New Britain, Conn., assignor to Royal Typewriter Company, Inc., New York, N.Y., a corporation of Delaware Continuation of application Ser. No. 349,253, Mar. 4, 1964. This application Nov. 16, 1966, Ser. No. 596,717
4 Claims. (Cl. 340—347)

Figure 1:
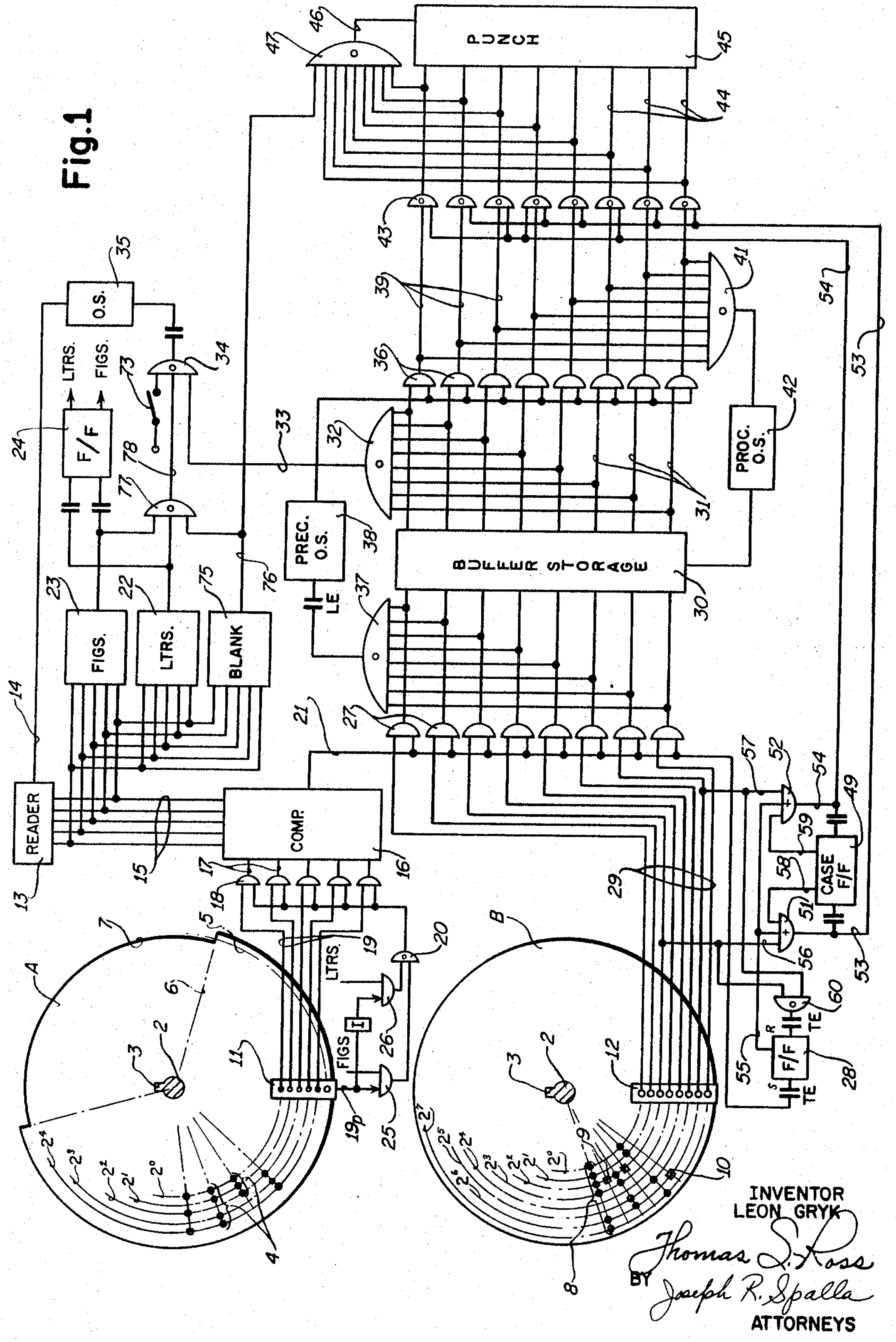

This invention relates to code converters; more particularly it relates to apparatus for converting first system codes into corresponding second system codes characterized by its ability to automatically generate second system precedence codes in a facile manner.

Data processing systems generally employ binary codes to represent information. Since the number of combinations possible in an $n$ bit code is $2^n$ it has been the practice to employ two of the possible $2^n$ combinations as precedence codes thereby to permit the use of each of the remaining $2_n-2$ combinations to designate two different characters. For example, codes following one of the precedence codes might represent lower case information on a typewriter keyboard and the same codes following the other precedence code might represent upper case information on the typewriter keyboard. The difficulty in providing apparatus for converting first system codes to second system codes, aside from the fact that many systems do not employ the same code assignment for a particular character, resides in the fact that lower case information in one system is likely to be upper case information in another system. Systems for converting first system codes to second system codes heretofore advanced accommodate the above difficulty only with complex and expensive circuitry.

In accordance with the present invention the above difficulty is accommodate by simple and inexpensive apparatus which permits of the conversions of codes of any one system to codes of any one of several other systems by the simple expedient of changing records on which first system codes to be converted and corresponding codes of a second system to which the first system codes are to be converted are prerecorded.

Broadly in accordance with the invention circuitry is provided to compare input and prerecorded first system codes, to sense and store during coincidence of input and prerecorded first system codes the prerecorded second system code corresponding to the coincident first system code, to thereafter determine from the prerecorded medium the precedence or case assignment of the stored second system code and to generate a precedence code for reproduction if required and after an interval sufficient for reproduction of the precedence code, then to read out the stored second system code for reproduction.

An object of the invention is to provide a code to code converter with provision for generating precedence codes in a facile manner.

Another object of the invention is in the provision of a code to code converted employing prerecorded records containing first system codes to be converted and second system codes to which said first system codes are to be converted whereby any code system may be converted to any other code system simply by changing records.

A further object of the invention is in the provision of a code to code converter whereby any code system may be converted to any other code system at high speeds.

A further object of the invention is to provide a code to code converter which is capable of converting first system codes to second system codes wherein character code assignments as well as upper and lower case character assignments differ.

A still further object of the invention is in the provision of a code to code converter employing first and second endless records having prerecorded thereon codes to be converted and codes to which said first codes are to be converted respectively, said second record containing prerecorded precedence information.

Still another object of the invention is in the provision of a code to code converter wherein coincidence of input and prerecorded first system codes enable the readout of corresponding prerecorded second system codes and the generation of second system precedence codes where necessary.

Figure 2:
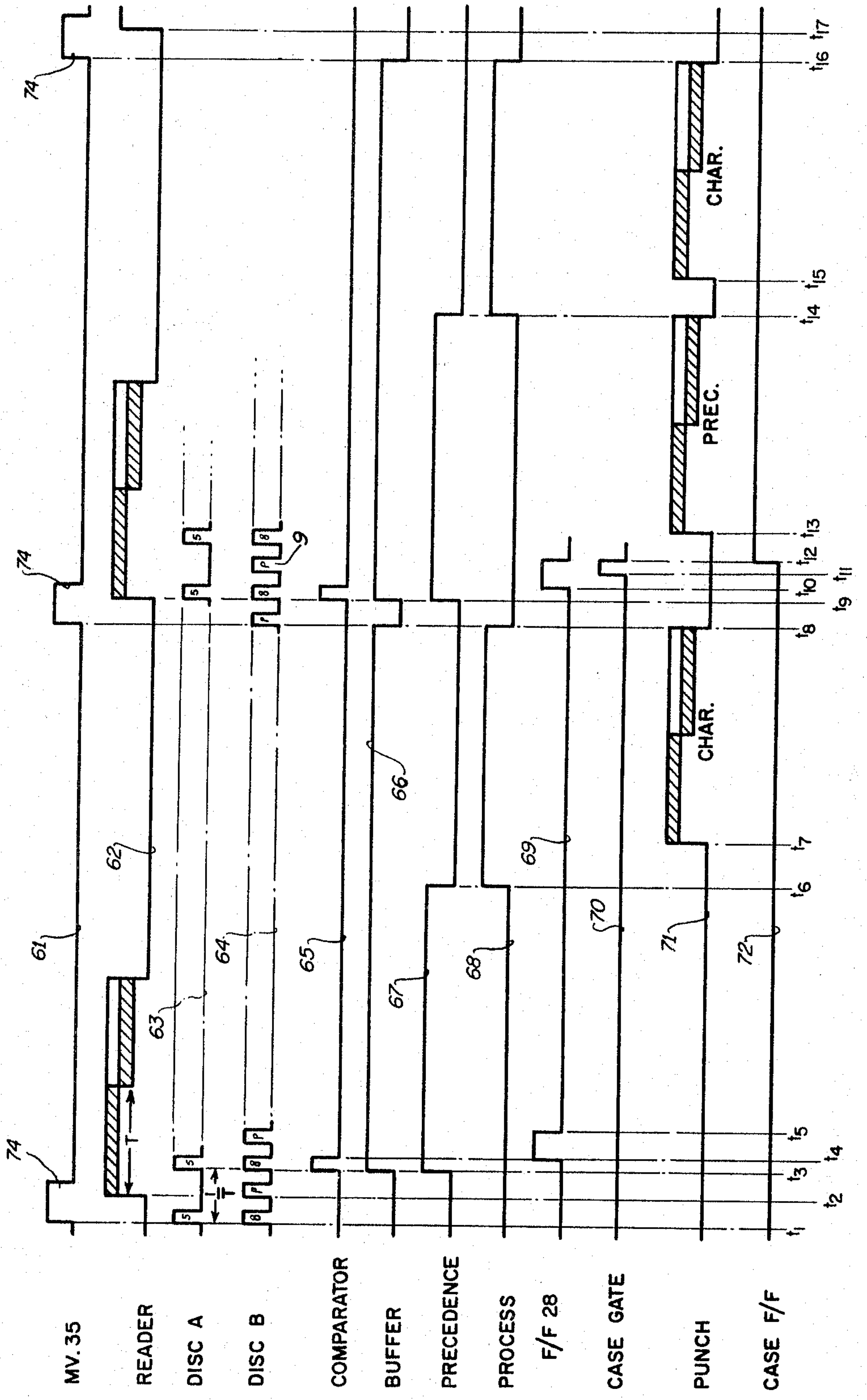

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a schematic block diagram of a code converter in accordance with the invention employing two prerecorded discs; and FIGURE 2 is a timing diagram explanatory of the operation of the FIGURE 1 logic circuitry.

Referring now to the drawings wherein like reference characters designate like or corresponding elements throughout the several views there is shown in FIGURE 1 disc records A and B. The discs are adapted to be synchronously driven, and to this end they may be mounted in axially spaced relation on a motor driven shaft 2; the shaft being provided with a spline 3 and the discs with complementary keyways whereby the disc are driven in fixed orientation relative to one another.

Disc A has recorded therein, as by perforating along radial lines, parallel bit code patterns 4 representing all the characters of and in accordance with a first system code assignment. The bits of the code patterns are recorded in parallel circular tracks designated $2^0$–$2^n$.

Due to the fact that identical code patterns are, in most systems, employed to represent two different characters, i.e. an upper and lower case character, and are distinguishable by type basket operating case precedence or letters and figures precedence codes, in order to represent all of the first system characters requires that each dual meaning first system code be recorded twice in the disc A. In accordance with the invention identical code patterns recorded on the disc A are distinguishable by the presence or absence of a hole accompanying the code pattern recorded in a precedence or case designator track 5. As viewed in FIGURE 1 upper case character representative or "Figures" codes are grouped in a sector 6 and identical lower case character representive or "Letters" codes in the remaining disc area, thereby to simplify the recording of case precedence designator holes by permitting a peripheral portion 7 to be cut away from the upper case or Figures sector 6 of the disc. Machine function code pattern such as carriage return, space, etc., which have no case will be recorded in both Letters and Figures sectors. This arrangement permits, as will hereinafter appear, the problem of the ambiguity of identical first system code patterns to be resolved.

Similarly disc B has recorded therein, as by perforating along radial lines, parallel bit code patterns 8 representing all the corresponding characters of and in accordance with a second system code assignment.

The code patterns 4 and 8 are recorded on the discs such that code patterns representative of the same character have the same angular orientation relative to a reference such as the keyways. In a 5 to 8 converter, the first system code patterns will occupy bit tracks $2^0$ . . . $2^4$ on disc A and $2^0$ . . . $2^7$ on disc B.

In accordance with the invention the precedence or case assignment of the character represented by each code pattern on disc B regardless of its precedence or case assignment in the first system code must be determinable. Accordingly, radial increments between code patterns 8 have recorded therein precedence or case designator, holes 9 or 10, designating the case, upper or lower, of the character represented by the code pattern preceding it. The precedence case designator holes may be recorded in discrete upper and lower case precedence track or as shown in the figure may be recorded in bit tracks e.g. tracks $2^2$ and $2^6$ whereby transducers associated with these tracks may serve as precedence detectors as well as bit detectors.

Associated with discs A and B are transducer assemblies 11 and 12 respectively adapted to sense the perforated code patterns on the discs.

Transducer assemblies suitable for sensing hole patterns may comprise light sources on one side of the discs and light responsive cells arrayed on the other side of the discs opposite each track. The transducer assemblies will be positioned such that each simultaneously reads a code on its corresponding disc representing the same character.

In accordance with the invention code signal patterns of one system that are to be converted and which are usually stored in a tape may be supplied to the code converter by a tape reader and corresponding second system codes may be reproduced in a second tape by a record perforator A conventional tape reader generally designated by reference numeral 13 which responds to a true signal on a command line 14 may be employed in conjunction with the code converter of the invention. Signals will be designated true or false herein; the former being those which initiate or result from desired operation of a circuit element; the latter signals being the opposite. True and false signals may be positive or negative or vice versa. As will be understood by those conversant in the art a true signal on the command line 14 will cause the reader to cycle whereby during the cycle code signal patterns will be issued to output lines 15 and the record will be indexed.

The speed of the discs will be determined by the interval T (FIGURE 2) that code signal patterns are issued to output lines 15; the disc speeds being such that they make a complete revolution during the interval T that code signal patterns are on lines 15.

The reader output lines 15 are connected to a comparator 16 as are the output lines 17 of AND gates 18. One leg of each of the AND gates is connected to an associated light responsive cell input line 19 of the transducer assembly 11 and the other legs of the AND gates 18 are connected to the output of an OR gate 20 adapted to pass, as will hereinafter appear, a true signal only during the interval Figures codes are being sensed or only during intervals the Letters codes are being sensed. Accordingly, if the reader issues to lines 15 an upper case character representative code as determined by an issued preceding Figures code, when the transducer assembly 11 senses the identical code pattern in the Figures sector 6 of disc A a true signal will be generated on the output line 21 of the comparator.

To determine which codes are to be compared i.e. first system Figures or Letters codes, the reader output lines 15 are connected to a Letters code detector 22 and a Figures code detector 23 which recognizes these codes and generate a true signal on their output lines which are connected respectively to the set and reset terminals of a case memory flip flop 24 whereby the leading edge of a Letters signal will set the flip flop and the leading edge of a subsequent Figures signal will reset the flip flop. The two outputs of the flip flop are connected respectively to a Figures and a Letters AND gate 25 and 26 whereby if the flip flop is set to the output to the Figures AND gate 25 will be false and the output to the Letters AND gate 26 will be true; the opposite obtaining when the flip flop is in reset state. The output line 19P of the precedence or case designator track detecting cell of the transducer assembly 11 is connected directly to the Figures AND gate 25 and indirectly through an inverter I to the Letters AND gate 26.

If the flip flop 24 is in an assumed Letters or set state, the Letters AND gate output will be true over the interval of time during which no openings in the precedence or designator track 5 are being detected by the precedence or designator detector cell of assembly 11. Similarly if the flop flop 24 is in an assumed Figures or reset state, the Figures AND gate output will be true over the interval of time during which openings in the precedence or designator track 5 are being detected. The outputs of the case AND gates 25 and 26 are connected to the OR circuit 20 whose output, as hereinbefore noted, conditions AND gates 18 to pass bit signal patterns on lines 19 to the comparator for comparison with code signal patterns on the reader output lines 15.

In view of the above it will be apparent that if the first code issued by the reader is a Letters code the flip flop will, if not already in a set state, switch to set state. Accordingly, the Letters gate 26 will be conditioned to pass a Letters precedence signal and the Figures gate 25 will be blocked to Figures precedence signals. Letters precedence signals will be generated when no openings are detected in the precedence or case track 5 and Figures precedence signals when openings are detected. Only signal patterns of codes in the Letters sector of the disc A therefore will be permitted to pass AND gates 18 for comparison with the code signal patterns to be converted; gates 18 being blocked to signal patterns of codes in the Figures sector 6 as both AND gates 25 and 26 will be blocked over the interval codes in sector 6 are passing the transducer assembly 11.

The output line 21 of the comparator is connected to one leg of each of eight AND gates 27 and to the set terminal of a flip flop 28 adapted to switch to set condition in response to the trailing edge of the signal on line 21 for reasons which will hereinafter appear. The other legs of the AND gates 27 are connected to associated light responsive cell output lines 29 of the transducer assembly 12 whereby the code signal pattern detected by the transducer assembly 12 is passed through gates 27 during the coincidence interval to bit flop flops in a buffer storage unit 30 thereby storing the 8 bit code pattern 8 corresponding to the 5 bit input code pattern on lines 15. The bit output lines 31 of the buffer storage unit are connected to an OR gate 32 whose output line 33 is connected to one of three inputs to a second OR gate 34. The output of OR gate 34 is connected to the trigger terminal of a one shot multivibrator 35 which responds to the trailing edge of a true signal passed by OR gate 34. The output signal derived over the active interval of the multivibrator, which might be incorporated in the reader unit logic, is connected to the reader command line 14 and its duration need only be sufficient to assure the initiation of a reader cycle, e.g. an interval at least equivalent to the pull in time of a cycle clutch magnet. The trailing edge of the true signal passed by gates 32 and 34 coincides with the resetting of the buffer unit 30 whereby the reader is cycled only after data in the buffers has been processed as will hereinafter appear.

The buffer output lines 31 are also each connected to one leg of associated AND gates 36. The outputs of the AND gates 27 are also ORed in an OR gate 37 whose output line is connected to the trigger terminal of a one shot precedence delay multivibrator 38 adapted to be triggered in response to the leading edge of the gate output signal. The output of the multivibrator 38 is connected to each of the other input legs of AND gates 36, thereby to block AND gates 36 over its active interval thereby to provide sufficient time for the processing of a precedence code as will hereinafter appear. The output lines 39 of the AND gates 36 are also ORed in an OR gate 41 whose output triggers a process delay multivibrator 42 whose output is connected to the reset terminal of the buffer unit 30 whereby the latter will reset after the active interval of the multivibrator 42. The output lines of the AND gates 36 are also connected through OR gates 43 to the bit input lines 44 of a conventional record perforating unit generally designated by reference 45. The record perforating unit is one which will reproduce the code pattern on lines 44 in a tape in response to a start process or cycle initiating clutch signal on a command line 46. The leading edge of the command signal may be employed to trigger a one shot delay multivibrator within the punch logic which will remain in active state over an interval sufficient to assure the initiation of a punch cycle, e.g. an interval at least equivalent to the pull in time of a cycle clutch magnet. The command line 46 is connetced to the output of an OR gate 47 having all 8 code lines 44 connected as inputs thereto, so that if any bit is present a process signal will pass the OR gate 47. The delay provided by multivibrator 42 is to assure sufficient time for the punch unit to record the code signal pattern before the buffers are reset and consequently before the reader emits a subsequent code in response to the resetting of the buffer.

In order that the second system precedence codes may be reproduced the invention provides a case condition flip flop 49 and upper and lower case detectors in the form of AND gates 51 and 52 respectively. Each case detector gate has three inputs all of which must be true to gate a signal to the gate output lines 53 and 54.

As noted hereinbefore the output line 21 of the comparator is connected to flip flop 28 which is adapted to switch from a reset to a set state in response to the trailing edge of the comparator true signal. The output line 55 of the flip flop is connected to one of the input legs of both the upper and the lower case AND gates 51 and 52; accordingly when flip flop 28 is set both AND gate inputs connected to line 55 will be true. The output line 56 from the transducer cell adapted to sense upper case holes 9 is connected to another input of the upper case AND gate 51 and the output line 57 from the cell positioned to sense the lower case holes 10 is connected to another input of the lower case AND gate 52. The third input of the upper case AND gate 51 is connected to one of the output lines 58 of the case condition flip flop 49 and the third input of the lower case AND gate is connected to the other output line 59 of the case condition flip flop. The normal state e.g. lower case state, of the case condition flip flop is such that output line 58 is normally true and output line 59 is normally false. Accordingly, after coincidence, flip flop 28 having been set, only the upper case AND gate 51 will be conditioned; thereby to pass the precedence or case designator signal generated upon detection of an upper case hole 9 following the code pattern 8 corresponding to the coincident 5 level code pattern 4. Both cell lines 56 and 57 are ORed in an OR gate 60 whose output is connected to the reset terminal of the flip flop 28 whereby the latter will switch back to reset state on the trailing edge of the precedence or case designator sensing interval. The output lines 53 and 54 of the AND gates 51 and 52 are connected respectively to the set and reset terminals of the case condition flip flop 49 which sets and resets in response to the trailing edge of the signals passed by the upper case and lower case AND gates respectively. The output lines 53 and 54 of the AND gates 51 and 52 are also selectively connected via OR gates 43 to those punch input lines 44 which define the upper and lower case precedence codes whereby they may be processed.

With reference to FIGURE 2, curve 61 represents the output of multivibrator 35; curve 62 represents the reader cycle times; curves 63 and 64 represent the output of transducer assemblies 11 and 12; curve 65 represents the comparator output; curve 66 represents the buffer output; curve 67 represents the output of the precedence multivibrator; curve 68 represents the output of the process delay multivibrator; curve 69 represents the output of flip flop 28; curve 70 represents the output of either of the AND gates 51 or 52; curve 71 represents the punch cycle times; and curve 72 represents the state of the case condition flip flop 49.

*Operation*

With the discs A and B rotating clockwise, the reader may be initially cycled by momentarily closing and opening a start switch 73 thereby applying a true signal to gate 34. The trailing edge of the gate output signal will trigger multivibrator 35 thereby to generate a reader command signal 74 at time $t_1$ (curve 61). After an interval sufficient to enable the energization of a cycle clutch magnet the reader will cycle at time $t_2$, as illustrated by curve 62, generating a bit signal pattern on lines 15 over the sense interval T. During the sense interval T of the reader cycle the discs A and B will have made a complete revolution such that within an interval $1/T$ beginning e.g., at time $t_3$, a five bit signal pattern 4 in the Letters or Figures sector of disc A, as the case may be, as determined by the last precedence code issued by the reader as hereinbefore explained, will coincide with the signal pattern on lines 15 whereupon the comparator output line 21 will go true over the interval $t_3$–$t_4$ thereby conditioning gates 27 to pass the corresponding 8 bit code pattern 8 sensed simultaneously from disc B over the coincidence interval $t_3$–$t_4$ and to set the flip flops in the buffer unit 30 at time $t_3$ and via OR gate 37 to trigger the precedence delay multivibrator 38.

The trailing edge of the comparator true signal will set the memory flip flop 28 at time $t_4$. The switching of the comparator memory flip flop 28 to set state applies a true signal via line 55 to upper and lower case AND gates 51 and 52. As the case condition flip flop 49 is normally in a lower case or reset state two of the inputs to the upper case AND gate 51 will be true. As the disc B rotates beyond the coincident first system code pattern 8, either an upper or lower case precedence or designator hole 9 or 10 will be sensed. If it is a lower case hole 10, indicating that the corresponding character in the second system is lower case, the third input (line 56) to the upper case AND gate 51 will remain false so that no signal is passed thereby. Hence the case condition flip flop 49 will remain in reset state. The lower case AND gate 52 likewise will not pass a signal as its input connected to the case condition flip flop output line 59 will be false. The detected precedence or case designator signal on line 57 will however pass OR gate 60 thereby resetting the flip flop 28 at the end of the precedence sensing interval i.e. time $t_5$ thereby to block gates 51 and 52 so that precedence or case designator holes sensed prior to the next coincident code will not be passed and thereby generate spurious precedence codes or switch the case condition flip flop.

Since neither of the AND gates 51 or 52 pass a signal the punch will not be cycled during the precedence interval $t_3$–$t_6$. While the precedence multivibrator 38 is active, gates 36 cannot pass the bit signals stored in the buffer 30. At $t_6$ however, the AND gates 36 pass the bit signal pattern to lines 39 and to the punch input lines 44 thereby setting up selected punch magnets. The perforator unit 45 in response to the command signal from OR gate 47, also generated at time $t_6$, will after a predetermined interval, initiate a punch cycle at time $t_7$ whereby the code signal pattern will be recorded in and a record indexed over the interval $t_7$–$t_8$.

As hereinbefore noted the buffer flip flops will be reset after a delay initiated by process multivibrator 42 which is triggered at time $t_6$ by the leading edge of the signal pass by OR gate 41 resulting from passage of bits signals through AND gates 36; the delay being provided to give the record perforator sufficient time to reproduce the data and index the record tape. As shown in FIGURE 2 (curve 68), the delay multivibrator 42 remains active until the end of the punch cycle at time $t_8$. Accordingly the buffers will be reset at time $t_8$ and the trailing edge of the signal from OR gates 32 and 34, which is true over the storage interval, will trigger the multivibrator 35 at time $t_8$ thereby to initiate another cycle of the reader at time $t_9$.

If an upper case precedence hole 9 is sensed after the next coincidence interval, illustrated as occurring at time $t_9$, the memory flip flop 28 being set in response to the trailing edge thereof at time $t_{10}$, all three inputs to the upper case AND gate will be true at time $t_{11}$ and the output of the gate 51 will remain true over the precedence sensing interval $t_{11}$–$t_{12}$. The trailing edge of the AND gate output signal will set the case flip flop to upper case state at time $t_{12}$. The gated precedence signal on line 53 is connected to selected bit lines 44 which define the second system upper case precedence code pattern thereby setting up punch magnets and via OR gate 47 initiating a punch cycle as before, over the interval $t_{13}$–$t_{14}$. The leading edge of the bit signals passed by gates 27 will via OR gate 37 trigger the precedence delay multivibrator 38 at time $t_9$ thereby blocking and maintaining AND gates 36 blocked over the interval sufficient for the precedence code to be reproduced; the interval being set to terminate coincidentally with the termination of the punch cycle at time $t_{14}$.

As before the second system code pattern 8 corresponding to the coincident first system pattern 4 will be set into the buffer flip flops at time $t_9$. As shown in FIGURE 2 when the precedence delay multivibrator returns to quiescent state at $t_{14}$ the AND gates 36 will open to pass the signal in the buffers to lines 39 and to the punch input lines 44; the signals on lines 39 via OR gate 41 triggering the process multivibrator 42 at time $t_{14}$. As before the punch will be cycled at a predetermined time thereafter i.e. at a time $t_{15}$ to record the second system code pattern over the interval $t_{15}$–$t_{16}$ after which, the buffers having been reset, another reader cycle may be initiated at a time $t_{17}$. As is evident from FIGURE 2 (curve 66) the buffer unit always remains set over the intervals of both multivibrators 38 and 42.

The case condition flip flop 49 will remain in set state until coincidence of a first system code which is lower case in the second system. In this event AND gate 52 will pass a signal which will reset the case condition flip flop 49 and effect the processing of a lower case precedence code pattern during the interval of multivibrator 38 and the processing of the second system pattern corresponding to the coincident first system code pattern during the active interval of multivibrator 42 in the same sequence as when upper case AND gate 51 passed a signal.

When a blank is emitted by the reader, no blank code being prerecorded on disc A, it is detected by a blank detector 75 whose output line 76 is connected to OR circuit 47. This will cycle the record perforating unit 45 which, since no code pattern is on lines 44, will simply index tape. The output of the blank detector is also connected to an OR gate 77 whose output line 78 is connected to an input of OR gate 34 whereby the trailing edge of the blank detector true signal will cause the multivibrator 35 to be triggered. As noted hereinbefore the output signal of the multivibrator 35 will initiate another reader cycle.

If a 5 level upper or lower case precedence code is issued by the reader, no corresponding codes being recorded on a disc A, they are detected in associated detectors 22 and 23 as hereinbefore noted and whose outputs are also ORed in OR gate 77 thereby to effect a subsequent reader cycle.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. Apparatus for converting code patterns of a first system into corresponding code patterns of a second system wherein code patterns in each system may be employed twice to represent upper and lower case information, said dual means code patterns being distinguishable by lower and upper case precedence code patterns designating that code patterns following a precedence code pattern represent lower or upper case information, and wherein information assigned to upper and lower case is likely to differ from system to system comprising:

a first disc having serially recorded therein on radial lines first system code patterns, a second disc having serially recorded therein on radial lines all of corresponding ones of second system code patterns and designators of the case of the information represented thereby, the radial line next following each radial line bearing a second system code pattern having recorded therein the designator of the case of the information represented by the preceding code pattern, the code patterns in said first and second discs representing the same information being orientated at the same angular positions with respect to a reference on each of said discs, a continuously driven shaft, means mounting said discs with said references in alignment on said shaft, first and second transducer means associated with said first and second discs respectively, said transducer means being positioned to simultaneously read corresponding code patterns and case designators thereby generating code signal patterns and case designator signals as said discs are driven, a source operative to issue first system code signal patterns, means to compare for coincidence first system code signal patterns generated by said first transducer means and a first system code signal pattern issuing from said source and to generate an output signal over the interval of coincidence of said first system code signal patterns, first gate means conditioned by said output signal for passing the second system code signal pattern generated by said second transducer means during the interval of coincidence of first system code signal patterns, a buffer unit for storing code signal patterns passed by said first gate means, means for recording second system code signal patterns, second gate means normally conditioned to pass stored second system code signal patterns to said recording means, first delay means being responsive to code signal patterns passed through said first gate means for blocking said second gate means over an interval necessary to generate and record a second system precedence code signal pattern, second delay means responsive to code signal patterns gated by said second gate means for resetting said buffer unit after an interval sufficient to record the code signal patterns passed by said second gate means, means operative on said source in response to the resetting of said buffer to cause another first system code signal pattern to issue therefrom, and means responsive to said output signal and to a designator signal generated by said second transducer means following the coincidence interval which differs from the designator signal generated by said second transducer means following the previous coincidence interval for generating a precedence code signal pattern for recording during said first delay interval.

2. Apparatus as recited in claim 1 wherein said last named means comprises a memory flip flop operable to set state in response to the trailing edge of said output signal, an upper and a lower case gate conditioned for operation by said set memory flip flop, a case condition flip flop operable in reset state to condition the lower and block the upper of said case gates and in set state to block said lower and condition the upper of said case gates, said case condition flip flop being settable and resettable in response to the trailing edge of the output signals from said lower and upper case gates respectively, means responsive to the output signal of said lower case gate for generating a lower case precedence code signal pattern, means responsive to the output signal of said upper case gate for generating an upper case precedence code signal pattern, and means connecting upper case designator signals generated by said second transducer means to said upper case gate for passage thereby when said case condition flip flop is in reset state and lower case designator signals generated by said second transducer means to said lower case gate for passage thereby when said case condition flip flop is in set state, the trailing edge of said gate designator signals resettting said memory flip flop.

3. Apparatus as recited in claim 1 further comprising means responsive to source issued code signal patterns not prerecorded on said first disc for directing said source to generate a subsequent code signal pattern for conversion.

4. Apparatus as recited in claim 1 wherein each code pattern recorded on said first disc includes on the same radial line a case designator of the information represented by the code pattern, said apparatus further comprising, third and fourth gate means operable when conditioned to pass respectively lower and upper case designator signals generated by said first transducer means, a bistable circuit operable to set and reset state in response to source issued lower and upper case precedence code signal patterns respectively and operable in set and reset states respectively to condition said third and fourth gates, and fifth gate means condtioned by the signals passed by either of said third and fourth gate means for passing to said comparing means code signal patterns generated by said first transducer means whose case designator corresponds to the last source issued precedence code signal pattern.

No references cited.

DARYL W. COOK, *Acting Primary Examiner.*

A. L. NEWMAN, *Assistant Examiner.*